United States Patent [19]

Graf et al.

[11] 3,998,041
[45] Dec. 21, 1976

[54] FALSE TWIST DEVICE AND METHOD OF PRODUCING A TEXTURED YARN OR THE LIKE

[75] Inventors: Felix Graf; Jakob Fluck; Hans Schellenberg, all of Winterthur, Switzerland

[73] Assignee: Rieter Machine Works Ltd., Winterthur, Switzerland

[22] Filed: Mar. 1, 1976

[21] Appl. No.: 662,978

[30] Foreign Application Priority Data

Sept. 26, 1975 Switzerland ............... 12550/75

[52] U.S. Cl. .................. 57/77.4; 57/157 TS
[51] Int. Cl.² .................. D02G 1/04; D01H 7/92
[58] Field of Search ............ 57/77.3–77.45, 57/156, 157 TS, 157 R

[56] References Cited

UNITED STATES PATENTS

| | | | |
|---|---|---|---|
| 3,287,890 | 11/1966 | McIntosh | 57/77.4 |
| 3,762,149 | 10/1973 | Roschle | 57/77.4 |
| 3,901,011 | 8/1975 | Schuster | 57/77.4 |
| 3,921,379 | 11/1975 | Smith | 57/77.4 |

FOREIGN PATENTS OR APPLICATIONS

| | | | |
|---|---|---|---|
| 1,254,093 | 1/1961 | France | 57/77.4 |
| 490,534 | 6/1970 | Switzerland | 57/77.4 |

*Primary Examiner*—Donald E. Watkins
*Attorney, Agent, or Firm*—Werner W. Kleeman

[57] ABSTRACT

A method of, and apparatus for, fabricating a textured yarn or the like comprising a false twist device containing a number of friction disks arranged in spaced coaxial relationship with respect to one another in succession and thread guide elements helically distributed along the circumference of the false twist device. The thread guide elements extend into the space between the disks and are helically arranged along the circumference of the false twist device in such a manner that a yarn contacting the disks and guided by the thread guide elements contacts the false twist device along a helix, the helix angle or pitch of which decreases in the direction of travel of the yarn.

10 Claims, 11 Drawing Figures

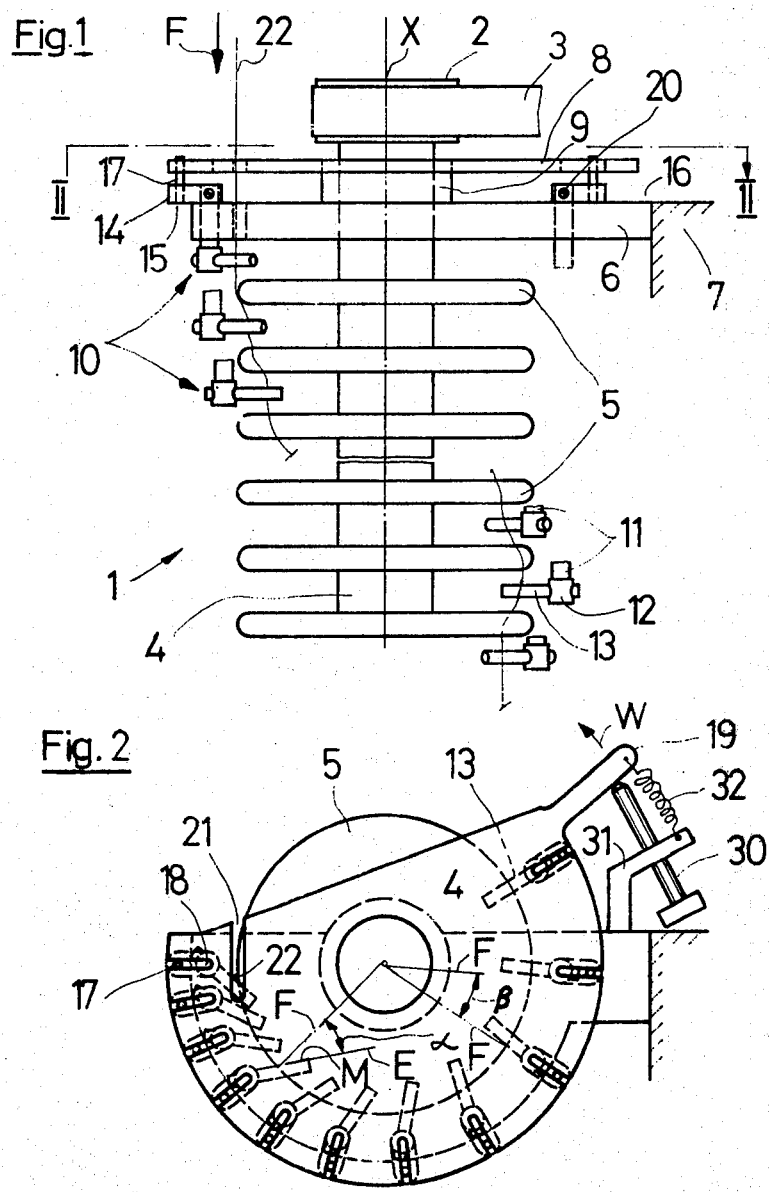

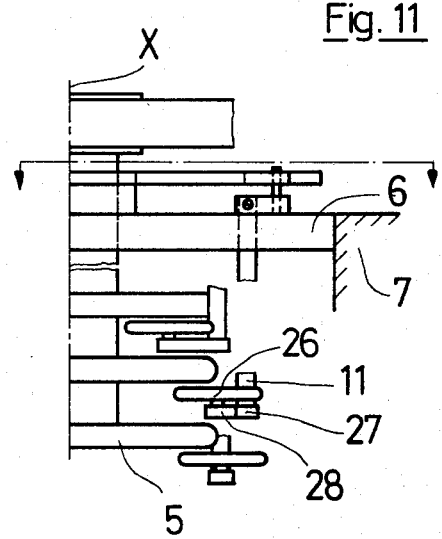
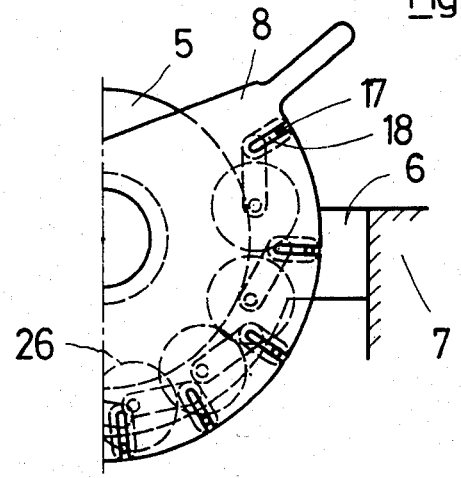

FALSE TWIST DEVICE AND METHOD OF PRODUCING A TEXTURED YARN OR THE LIKE

BACKGROUND OF THE INVENTION

The present invention relates to a new and improved construction of a false twist device of the type embodying a number of friction disks which are coaxially arranged in sequence and thread guide elements helically distributed along the circumference of the false twist device, the thread guide elements extending into the space between the friction disks. Further, this invention pertains to a novel method of producing a textured yarn or the like.

The friction between the thread and the friction surface which is required for imparting twist to the thread is generated, on the one hand, by the coefficient of friction between the thread and the friction surface and, on the other hand, indirectly by the thread tension prevailing at the region of the false twist device. The thread tension directly generates the normal force required for the friction between the thread and the friction surface. Hence, there is generated a friction force between the thread and the friction surface of the false twist device owing to the twist- and thread travel speeds directed at right angles to one another, and which friction force is opposite the direction of travel of the thread and thus produces an additional thread tension.

On the other hand, there prevails the requirement that the maximum applicable thread tension should not become too great so that the individual filaments are not ruptured.

Now in order to at least partially compensate the aforementioned additional thread tension there is disclosed in German patent application 1,660,639 and Czechoslovakian patent 106,286 a false twist device embodying a number of coaxial successively arranged friction disks and thread guide elements extending into the space between the friction disks such that the thread guided by the thread guide elements contacts the disks at a uniform inclination with respect to the circumferential direction. Due to the inclination of the thread guided at the false twist device the friction force transmitted to the thread is resolved into a component imparting twist to the thread and a component which transfers or feeds the thread. This thread transfer component reduces the thread tension required following the false twist device.

The drawbacks of the aforementioned state-of-the-art devices are considered to be the following:

a. Due to the aforementioned resolution of the friction force with inclined arrangement of the thread at the friction disk the imparting of twist is reduced in relation to the circumferential speed of the twisting or friction disks, so that such must be brought to a higher rotational speed corresponding to the reduction in the imparted twist. This requires a correspondingly increased power consumption and furthermore increases the wear of the friction surface.

b. It is known that the last friction disks, and in particular the very last friction disk, viewed in the direction of travel of the thread or the like, imparts by far the greatest proportion of twist to the thread so that such experience an appreciably greater amount of wear, resulting in rapid changes in the friction properties and thus, in turn, in changes in the texturizing characteristics.

c. Moreover, the thread transfer component only can be changed at the expense of the twist imparting component, or vice versa, in such a manner that there can be hardly attained optimum conditions as concerns imparting the twist and the thread tension.

SUMMARY OF THE INVENTION

Hence, it is a primary object of the present invention to provide an improved method of producing a texturized thread or yarn and an apparatus for the performance thereof in a manner not associated with the previously discussed drawbacks and limitations of the prior art proposals.

Another and more specific object of the present invention aims at overcoming the aforementioned drawbacks and providing a false twist device by means of which it is possible to optimumly impart twist to the thread with as small as possible difference between the thread tension prevailing before the false twist device and after the false twist device.

Now in order to implement these and still further objects of the invention, which will become more readily apparent as the description proceeds, the false twist device of this development comprises a number of friction disks coaxially arranged in sequence and thread guide elements distributed helically along the circumference of the false twist device. The thread guide elements extend into the space between the friction disks. In particular, these thread guide elements are arranged distributed along a helical configuration along the circumference of the false twise device in such a manner that a thread contacting the friction disks and guided by the guide element contacts the false twist device along a helix or helix line, the helix angle or helix increment of which decreases as viewed in the direction of thread transfer. Moreover, the thread guide elements can be pivotably arranged.

Not only is the invention concerned with the aforementioned apparatus aspects but deals with a method of producing a textured thread or the like which contemplates guiding the thread at the aforementioned friction disks under an angle which is less than 90° with respect to the circumferential direction of the disks. The thread is guided into contact with the successive arrangement of coaxially arranged friction disks such that the thread contacts the progressive friction disks under a decreasing angle with respect to the circumferential direction of such friction disks.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a simplified schematic view of a false twist device constructed according to the invention;

FIG. 2 is a cross-sectional view of the false twist device of FIG. 1, taken substantially along the line II—II thereof;

FIG. 7 is a variant embodiment of the thread guide element which can be used with the false twist device of FIG. 1;

FIG. 11 is a plan view of the arrangement of FIG. 7.

DETAILED DESCRIPTION OF THE INVENTION

Figure 8:
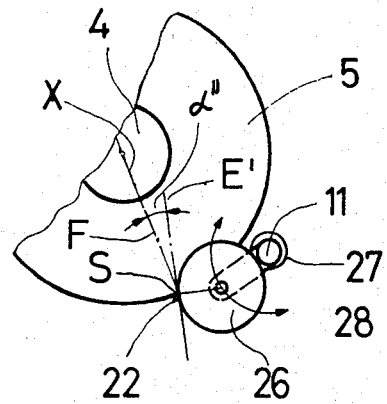
FIG. 8 illustrates a detail of the false twist device of FIG. 7.

Describing now the drawings, in FIGS. 1 and 2 there is illustrated a false twist device 1 comprising a drive shaft 4 driven by a pulley 2 and a drive pulley 3 drivingly contacting such pulley 2. Arranged at a predetermined spacing from one another upon the drive shaft 4 are a number of friction disks 5 which are fixed in any suitable manner to the drive shaft 4 so that they cannot rotate relative thereto. The drive shaft 4 is rotatably supported in a support member 6 which, in turn, is mounted at a fixed support 7.

Additionally, a control disk 8 is rotatably arranged about the shaft 4 and, viewed in the direction of the axis of rotation X of the false twist device, slidingly supported upon a spacer ring 9 bearing upon the support member or bracket 6.

Thread guide elements 10 are rotatably provided in an circular arrangement about the axis X of the false twist element on the support member 6. In order to simplify the showing of the drawing not all of the thread guide elements have been illustrated. The thread guide elements 10 comprise a shaft 11 rotatably mounted at the support member 6 (only one such shaft 11 being fully shown in FIG. 1) and a head 12 mounted onto the lower end of the shaft 11 for rigidly supporting a thread guide pin 13. The upper end of the shaft 11 located above the support member 6 is inserted into an end portion of a lever 14 and clamped thereto by means of a fixing screw 20 or equivalent structure. The lower side 15 of the lever 14 is slidably supported by the upper side of the support member 6. In another end portion of the lever 14 there is inserted a pin 17 forming a right angle with the lever 14 and rigidly connected therewith.

The terms "upper" and "lower" as used in this disclosure are intended to mean the direction opposite to the thread transfer and the direction of thread transfer, respectively.

Continuing, control disk 8 is provided with slots 18 for slidingly guiding the pins 17 with narrow clearance or play. A handle 19 is provided on the control disk 8 for rotating such control disk and an opening 21 is also provided for the through-passage or transfer of the thread 22. By loosening the fixing screw 20 it is possible to rotate the shaft 11 in such a manner as to be able to alter the contact angle or angle of inclination $\alpha$ (FIG. 2) of the thread guide pin 13. The inclination angle $\alpha$ as used in the context of this disclosure, is the angle enclosed by the imaginary planes E abd F (FIG. 2). The plane E is arranged parallel to the axis of rotation X and contains the contacting point 23 (FIG. 3) of the thread 22 on a thread guide pin 13, whereas the plane F is a plane containing the axis of rotation X and the contact or contacting point 23.

The thread guide elements 10 are circumferentially distributed in such a manner that the angle $\beta$ formed by two neighboring planes F is chosen to be larger for each subsequent thread guide pin 13 in a manner such that, considering the inclination angle $\alpha$, the thread 22 contacting the friction disks 5 and guided by the thread guide pins 13 contacts the friction disks with a decreasing throughpassage angle $\delta$ (FIG. 4), and this configuration can be described as a helix or helix line with a helix angle or pitch which decreases in the direction of thread travel. The angle $\alpha$ can be chosen to be equal to 0° or greater.

Figure 4:
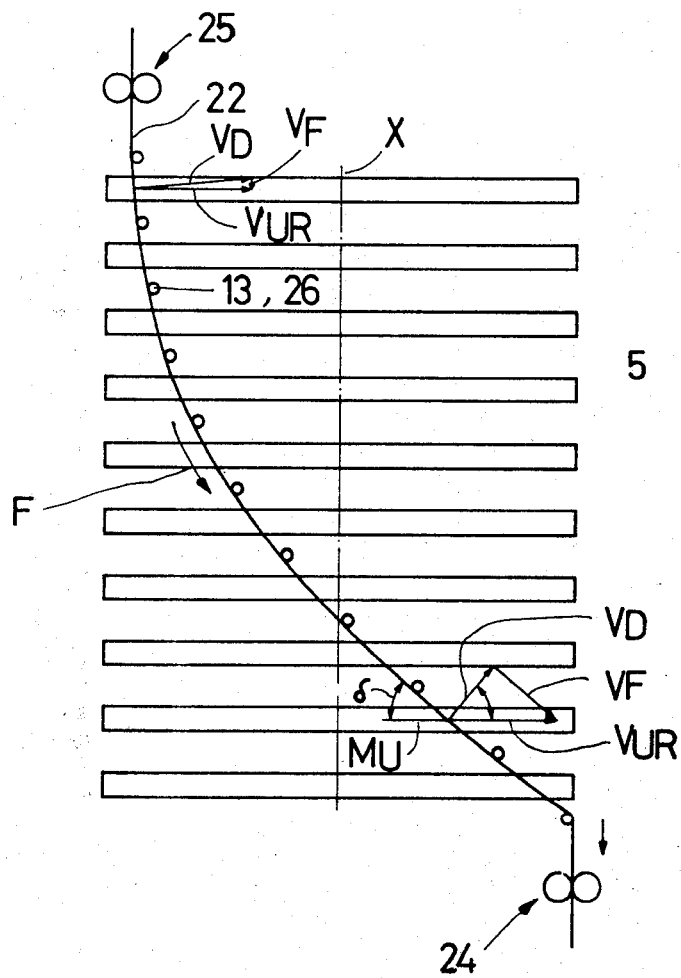
FIG. 4 is a development view of the false twist device of FIG. 1 showing the travel of the thread or yarn.

As illustrated in FIG. 4, in the context of this disclosure the throughpassage angle $\delta$ is defined as that angle which, with the false twist device viewed in development and a corresponding development of the thread guided in contact thereat, is enclosed by the thread and the central circumferential line $M_U$ of the individual friction disks 5.

Figure 3:
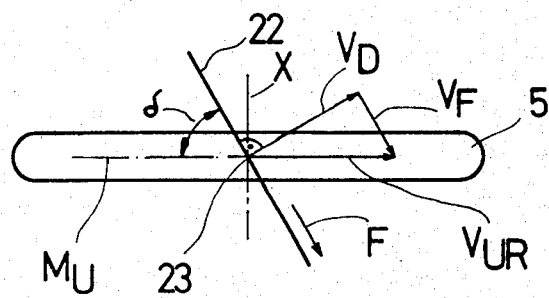
FIG. 3 illustrates a friction disk and shows the speed relations of a thread contacting the same.

As best seen by referring to FIG. 3, the circumferential speed $V_{UR}$ imparted to the thread 22 by the friction disk 5 can be resolved into two velocity components, namely into a velocity or speed component $V_D$ producing the twist at the thread and emanating from the contact point 23 at the circumferential line $M_U$, directed perpendicular to the thread 22 and extending between the thread and the friction disk 5, and a further component $V_F$ constituting a velocity or speed component and effective in the thread transfer direction and extending parallel to the thread 22. With the same diameter R of the friction disks 5 and if such rotate at the same speed then the component $V_D$ imparting the twist and the component $V_F$ assisting said transfer can be varied with the inventive thread travel arrangement in such a manner that:

a. On the one hand the transfer of feed component $V_F$ progressively assists the thread tension in the direction of thread travel from one friction disk to the next friction disk, and which thread tension is generated between a pair of conventional take-off rolls 24 provided downstream i.e. at the outfeed side of the false twist device and a pair of conventional delivery rolls 25 provided upstream i.e. at the infeed side of the false twist device; and b. On the other hand, the effective twist imparted to the thread by the twist imparting component $V_D$ is increased from one disk to the next as seen in a direction opposite to the direction of thread travel or transfer. The advantages which can be realized by virtue thereof reside in the following:

1. The thread tension required
  a. to overcome the sliding friction generated in the thread transfer direction between the thread and the friction disks, and
  b. to generate the normal force between the thread and the friction disk, is generated by the false twist device itself to such an extent that the ratio of the thread tensions before and after passing along the false twist device reaches values considerably lower thant the values previously achieved, and 2. The twist is no longer imparted substantially by the lowest disks, but is imparted more evenly throughout the entire false twist device.

Figure 5:
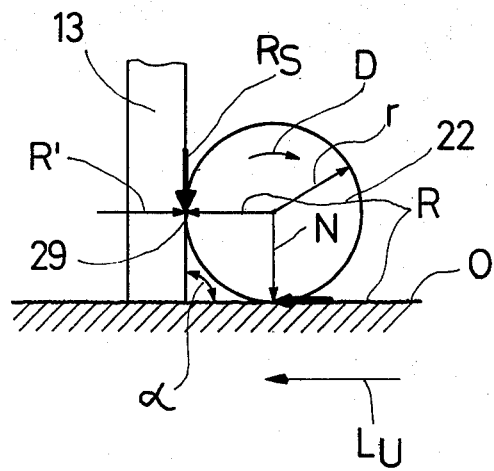
FIGS. 5 and 6 respectively schematically show the forces acting upon a thread driven by a friction disk.

As seen by referring to FIG. 5 the friction force R (= N.$\mu$) generates at the assumed contact point 29 together with the thread guide pin 13 arranged at an angle of inclination $\alpha$ = 90° a reaction and a corresponding friction force $R_S$.

The total torque or rotational moment $M_D$ available for imparting twist in the thread in the direction D thus is determined as follows:

$$M_D = r(R - R_S).$$

In order to maintain $M_D$ as large as possible, the surface of the pin 13 is accordingly chosen such that the friction $R_S$ is reduced to a negligible minimum.

Figure 6:
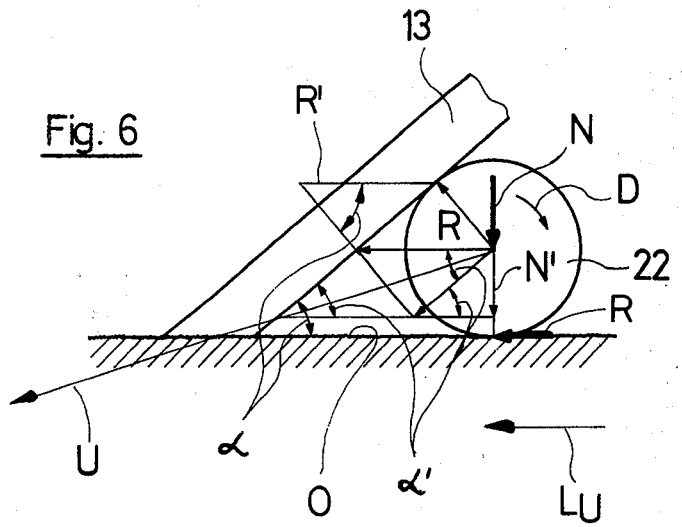

In the arrangement of FIG. 6 there is illustrated an angle of inclination $\alpha$ which is less than 90°. In this arrangement there thus occurs a wedge action which, on the one hand, induces an additional normal force $N'$ which is dependent upon the friction force ($N' = R.cos$ $\alpha'.sin\ \alpha'$; $\alpha + \alpha' = 90°$, assuming $R_S$ is equal to O) and, on the other hand, since the thread 22 is a flexible structure and inasmuch as the thread guide pins 13 are arranged between the disks, brings about a wrapping of the thread in the direction U 22 along the surface O of the friction disk, which enlarges the surfaces transmitting the friction force on the friction disk 5 and the thread 22.

Due to the increased friction force it is possible to additionally counteract any slippage between the thread and the friction disk. The term "slippage" is intended to mean the difference between the maximum twist which can be imparted and the twist which has been effectively imparted. Thus, there is present the advantage that with friction conditions determined by the fiber material and the surface properties of the friction disk, the twisting device can be adapted to a large extent to the twist to be imparted.

The angles of inclination $\alpha$ less than 90° must be determined by tests in accordance with the twist which is to be imparted, the fiber material at the friction disk-surface properties.

The rotatability of the control disk 8 and therefore the pivotability of the thread guide pins 13 affords not only the advantage of being able to adapt the angle of inclination $\alpha$, but also the advantage that the thread guide pins 13 can be pivoted during the threading-in process into a position, the so-called idling position, constituting negative angles of inclination. Consequently, there is the possibility of using the same element, typically a hand-held suction gun, for the threading-in process at the false twist device and at the other conventionally known elements of a false twist texturizing machine. A negative angle of inclination is present when the control disk 8 is rotated to such an extent in the direction of the arrow W until the largest of the angles of inclination $\alpha$ has reached a zero or negative value. After the thread has been engaged by the last element, for instance the take-up winding device, the thread guide elements are pivoted back into the operating position designated as that position having positive angles of inclination. Thus, undesirable thread tension peaks at the false twist device, possibly caused by the operation of the hand-held suction gun, are avoided.

To insure that the control disk 8 and thus the thread guide pins 13 are again reliably brought back into their operating position, the handle 19 can be brought into contact with a pre-threadable stop-screw 30 or equivalent structure which, in turn, is threaded into a holder 31 mounted at the support member 6. Furthermore, a coil spring 32 or equivalent device is connected with the handle 19 and the holder 31 and can insure for the aforementioned contact of the handle.

According to a variant embodiment of the invention the thread guide pins 13 can be arranged to be pivotable about the longitudinal axis in the zone of the guide pin where the thread is guided in any conventional manner, and the drive of the rotatable parts can be carried out by the action of the thread 22 itself or by any suitable drive device.

The advantage of this embodiment resides in the fact that the sliding friction between the thread 22 and the thread guide pins 13 is lower than for rigid pins in the direction of the thread transfer.

As shown in FIGS. 7 and 11, the thread guide pins can be replaced by thread guide disks 26 which are rotatable substantially in the axial direction of the false twist device.

This embodiment, as compared to that of FIGS. 1 and 2, differs in that the shaft 11 is provided with a head 27 at which there is provided a support member 28 upon which there is rotatably arranged the disk 26 about an axis parallel to the axis X.

Additionally, the disks 26, as shown in FIG. 7 with phantom lines, analogous to the thread guide pins 13, can be pivoted into the space between the friction disks.

Owing to this rocking or pivotability it is possible to alter the angle $\alpha''$ enclosed by the plane F and the plane E', as best seen by referring to FIG. 8. The plane E', analogous to the plane E, is parallel to the axis X of the false twist device, but contains the tangent T contacting the guide disk 26 extending through an intersection point S. The intersection point S, as viewed in the direction of the axis of the false twist device, constitutes the point of intersection at which the thread 22 is guided and which is formed by the circumferential lines resulting from the largest diameter of the disks 5 and 26. Since the thread cross-section is negligibly small in relation to the diameter of the disks 5 and 26, the position of the plane E' corresponds to that of the plane E, so that the angle $\alpha''$ corresponds to the angle $\alpha$.

The thread guide disks 26 are distributed along the circumference analogous to the distribution of the thread guide pins 13, i.e. in such a manner that the angle $\beta$ determined by two neighboring planes F is chosen larger for each consecutive disk 26, so that analogous to the arrangement of the thread guide pins 13 the thread 22 forms a helix or helix line, the helical angle or pitch of which, as viewed in the direction of thread transfer, decreases. Also in this arrangement it is possible to select the angle $\alpha'''$ to be equal to 0° or greater.

The advantage of this modification of the invention resides in the fact that the friction $R_S$ is still further reduced.

Figure 9:
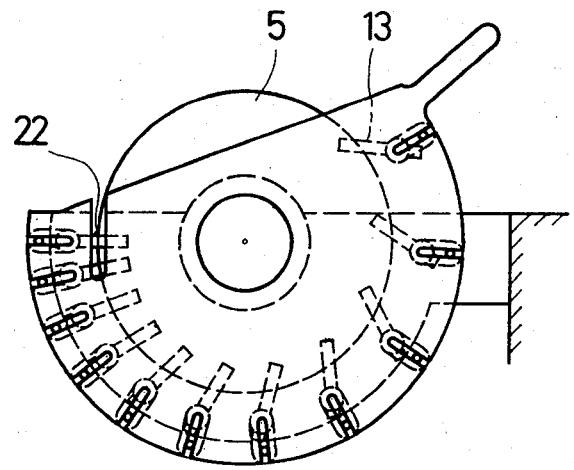
FIGS. 9 and 10 respectively illustrate modifications of the false twist device of FIGS. 1 and 2.
Figure 10:
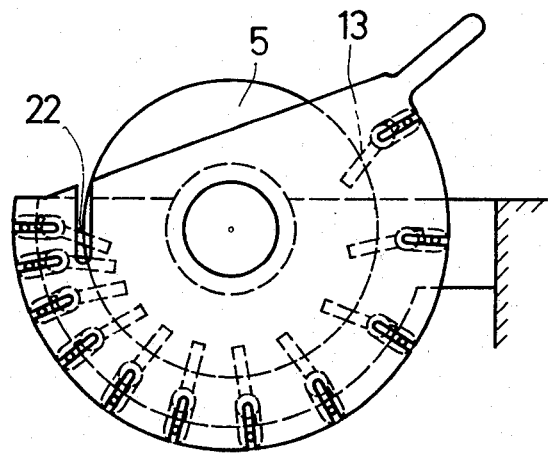

Finally, with the arrangement of FIGS. 9 and 10 there should be illustrated that the contact angle or angle of inclination $\alpha$, depending upon the twist to be imparted and the friction conditions between the thread 22 and the thread guide elements 13, can be chosen to be variably different. This is also true when there are used the disks 26.

While there is shown and described present preferred embodiments of the invention, it is to be distinctly understood that the invention is not limited thereto, tub may be otherwise variously embodied and practiced within the scope of the following claims.

According, what is claimed is:

1. A method of manufacturing a textured thread comprising the steps of:
   a. providing a false twist device having a infeed side and an outfeed side and containing a plurality of friction disks coaxially arranged in sequence;
   b. guiding the thread into contact with the disks so as to contact each disk at an angle of less than 90° with respect to the circumferential direction of the associated friction disk; and c. the step of guiding the thread including guiding the thread into contact with the friction disks so that the thread contacts each friction disk at a decreasing angle with respect to the circumferential direction of the disks from the infeed side to the outfeed side of the false twist device.

2. A false twist device comprising a number of friction disks, means for coaxially arranging said friction disks in spaced relationship from one another to define between each two neighboring friction disks a space, thread guide elements arranged helically distributed along the circumference of the false twist device, said thread guide elements extending into the spaces between the friction disks along a helical configuration about the circumference of the false twist device in such a manner that a thread contacting the friction disk and guided by the thread guide elements contacts the false twist device along a helix, the helix angle of which decreases in the direction of thread transfer.

3. The false twist device as defined in claim 2, including means for supporting the thread guide elements so as to be distributed along the circumference of the false twist device at increasing mutual distances in the circumferential direction.

4. The false twist device as defined in claim 2, further including means for pivotably mounting the thread guide elements.

5. The false twist device as defined in claim 2, further including means for permitting the thread guide elements to be collectively pivoted.

6. The false twist device as defined in claim 2, wherein the thread guide elements are arranged so as to form different angles of inclination extending into the spaces between the friction disks.

7. The false twist device as defined in claim 4, wherein the means for pivotably mounting the thread guide elements comprise a connecting member provided for each thread guide element, said connecting member being equipped with a shaft rotatably arranged and extending substantially parallel to the axis of the false twist device, each said connecting member being pivotably actuatable by the associated shaft.

8. The false twist device as defined in claim 7, further including means for conjointly pivoting the thread guide elements, said conjointly pivoting means embodying a transmitting element coupled with a common drive element for conjointly rotating the shafts.

9. The false twist device as defined in claim 2, wherein the thread guide elements are pivotable from an operating position where an individual thread guide element is arranged at a predetermined angle of inclination into an idling position.

10. The false twist device as defined in claim 7, wherein the thread guide elements are pivotable from an operating position into an idling position, and means for fixing the drive element in a position where the thread guide elements are in their operating position.

* * * * *